United States Patent
Hong

(10) Patent No.: US 7,881,269 B2
(45) Date of Patent: Feb. 1, 2011

(54) MEDIA TYPE ACCESS CATEGORY BASED CHANNEL MANAGEMENT FOR A WIRELESS NETWORK

(75) Inventor: Deanna Hong, Palo Alto, CA (US)

(73) Assignee: Symbol Technologies, Inc., Holtsville, NY (US)

( * ) Notice: Subject to any disclaimer, the term of this patent is extended or adjusted under 35 U.S.C. 154(b) by 790 days.

(21) Appl. No.: 11/494,650

(22) Filed: Jul. 26, 2006

(65) Prior Publication Data
US 2008/0025282 A1 Jan. 31, 2008

(51) Int. Cl.
*H04W 4/00* (2009.01)
(52) U.S. Cl. ........................ 370/338; 370/329
(58) Field of Classification Search ................ 370/338, 370/329, 341, 431
See application file for complete search history.

(56) References Cited

U.S. PATENT DOCUMENTS

| | | | |
|---|---|---|---|
| 6,934,752 B1 * | 8/2005 | Gubbi | 709/225 |
| 2003/0214905 A1 | 11/2003 | Solomon et al. | |
| 2006/0171304 A1 * | 8/2006 | Hill et al. | 370/228 |
| 2006/0189311 A1 * | 8/2006 | Cromer et al. | 455/434 |

FOREIGN PATENT DOCUMENTS

EP 1755281 A 2/2007
WO WO 2006117587 A1 * 11/2006

OTHER PUBLICATIONS

Wi-Fi Certified for WMM—Support for Multimedia Applications with Quality of Service in Wi-Fi Networks (Sep. 1, 2004) WiFi allience.*
International Search Report for International Application No. PCT/US2007/073916, mailed Jan. 30, 2008.
WI-FI Alliance: "Wi-Fi Certified for WMM—Support for Multimedia Applications with Quality of Service in Wi-Fi Networks" [Online]; Sep. 1, 2004, XP002464854, Retrieved from the Internet: URL:http://www.wi-fi-org/> [retrieved on Jan. 16, 2008]; p. 7, line 1—p. 9, line 5.

* cited by examiner

*Primary Examiner*—Rafael Pérez-Gutiérrez
*Assistant Examiner*—Munjal Patel
(74) *Attorney, Agent, or Firm*—Ingrassia Fisher & Lorenz, P.C.

(57) ABSTRACT

A method for channel management in a wireless network is disclosed. The method begins by a mobile client device receiving active channel information corresponding to active channels from infrastructure devices. Based upon the active channel information, the mobile client device selects an infrastructure device for communicating data for at least one of the media type access categories utilizing one of the active channels.

7 Claims, 3 Drawing Sheets

MEDIA TYPE ACCESS CATEGORY BASED CHANNEL MANAGEMENT FOR A WIRELESS NETWORK

TECHNICAL FIELD

Embodiments of the present invention relate generally to roaming among cells in a wireless network. More particularly, the present invention relates to automatic and semi-automatic channel management in wireless local area networks.

BACKGROUND

Wireless local area networks ("WLANs") can give clients the ability to "roam" or physically move from place to place without being connected by wires. In the context of a WLAN, the term "roaming" describes the act of moving between wireless access devices, which may be stand-alone wireless access points that cooperate with infrastructure located in the WLAN. Many deployments of wireless computer infrastructure, such as WLANs, involve the use of multiple wireless access devices serving a number of mobile client devices.

A wireless local area network ("WLAN") relies on infrastructure components that establish associations such as data communication links with mobile client devices. A mobile client device communicates, via a wireless data communication channel, with an access point device, which in turn communicates with other network components via traditional wired interfaces. A WLAN infrastructure may be configured to support a plurality of mobile clients using a single access point device. In other words, one access point device can support a plurality of different groups or categories of client devices each with a wide range of possible data rate or bandwidth requirements.

Most WLANs are governed by IEEE specification 802.11. The different variants of IEEE 802.11 are incorporated by reference herein. To form an association such as a data communication link between a mobile client device and a wireless access point, a mobile client device will require an active channel for transmitting data for at least one of the media type access categories such as the WMM/WME access categories of video, voice, best-effort, and/or background. The Wireless Multimedia/Wireless Multimedia Extension (WMM/WME) Specification (by Wi-Fi Alliance; www.wi-fi.org) provides for the distribution of WMM/WME parameters to mobile users in 802.11. Any WMM/WME documentation publicly available from Wi-Fi Alliance, either online or otherwise, and IEEE Standard 802.11 (all variants) are incorporated by reference herein. In particular, "Wi-Fi CERTIFIED™ for WMM™—Support for Multimedia Applications with Quality of Service in Wi-Fi® Networks," Wi-Fi Alliance (Sep. 1, 2004) is incorporated by reference herein.

The 802.11b and 802.1 μg protocols divide their designated spectrum (the FCC ISM band) into 14 channels with specified center frequencies 5 megahertz (MHz) apart. Existing IEEE 802.11 protocol devices utilize default channels assigned by country or international agreement. The channels that are available for use in a particular country differ according to the regulations of that country. In the United States, for example, FCC regulations only allow channels 1 through 11 to be used. In Europe, channels 1-13 are licensed for 802.11b operation. The default channel assignment may be communicated by an 802.11d international roaming information element.

802.11 devices may use all available channels, but in practice, two or three channels (active channels) are actually used by access points or ad hoc stations and networks. In this regard, 802.11 devices may spend significant time and power searching for networks on unused channels. This may cause out-of-band interference resulting in reduced data rate during data communications in congested networks. It is desirable to have a way to assign active channels for 802.11 devices. Other desirable features and characteristics of the present invention will become apparent from the subsequent detailed description and the appended claims, taken in conjunction with the accompanying drawings and the foregoing technical field and background.

BRIEF SUMMARY

Methods and systems for channel management in a wireless network are disclosed. To form an association such as a data communication link between a mobile client device and a wireless access point, a mobile client device will require an active channel for transmitting data for at least one of the media type access categories such as the WMM/WME access categories of video, voice, best-effort, and/or background. After considering currently available active channels for one or more WMM/WME access categories on the wireless access points, an active channel for communicating data for one or more WMM/WME access categories may be selected by the mobile client device.

The channel management method begins with receiving active channel information corresponding to media type access categories from wireless network infrastructure devices. Based upon the active channel information, a mobile client device selects an infrastructure device for communicating data for at least one of the media type access categories.

The selected infrastructure device obtains channel information corresponding to media type access categories for one or more mobile client devices supported by a second wireless network infrastructure device. Based upon the channel information, the selected infrastructure device determines active channels to be utilized for communicating data of at least one of the media type access categories. Information indicative of the active channels are sent to at least one mobile client device in the wireless network.

BRIEF DESCRIPTION OF THE DRAWINGS

A more complete understanding of the present invention may be derived by referring to the detailed description and claims when considered in conjunction with the following figures, wherein like reference numbers refer to similar elements throughout the figures.

DETAILED DESCRIPTION

Figure 1:
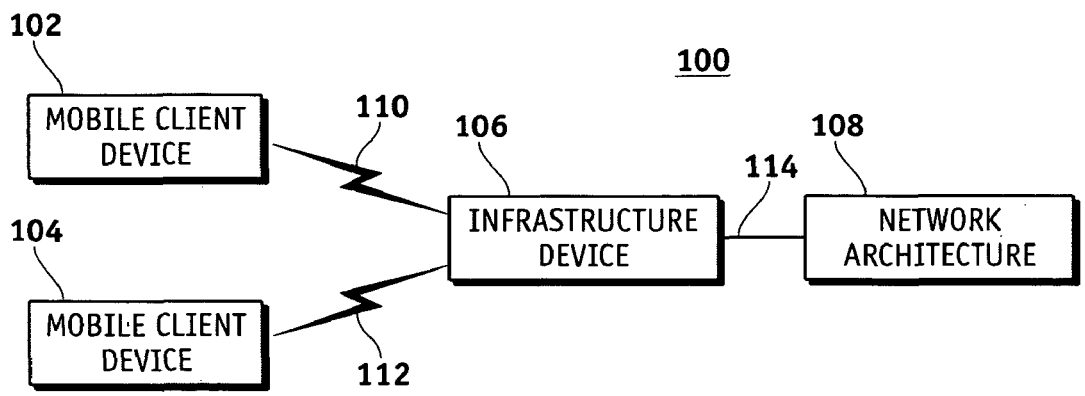
FIG. 1 is a simplified schematic representation of a typical WLAN infrastructure suitable for use in connection with an example embodiment of the invention.

The following detailed description is merely illustrative in nature and is not intended to limit the invention or the application and uses of the invention. Furthermore, there is no intention to be bound by any expressed or implied theory presented in the preceding technical field, background, brief summary or the following detailed description.

The invention may be described herein in terms of functional and/or logical block components and various processing steps. It should be appreciated that such block components may be realized by any number of hardware, software, and/or firmware components configured to perform the specified functions. For example, an embodiment of the invention may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that the present invention may be practiced in conjunction with any number of data transmission protocols and that the system described herein is merely one exemplary application for the invention.

For the sake of brevity, conventional techniques related to wireless signal processing, wireless data transmission, WLANs, signaling, network control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in a practical embodiment.

The following description may refer to elements or features being "connected" or "coupled" together. As used herein, unless expressly stated otherwise, "connected" means that one element/feature is directly joined to (or directly communicates with) another element/feature, and not necessarily mechanically. Likewise, unless expressly stated otherwise, "coupled" means that one element/feature is directly or indirectly joined to (or directly or indirectly communicates with) another element/feature, and not necessarily mechanically. Thus, although the figures may depict example arrangements of elements, additional intervening elements, devices, features, or components may be present in an actual embodiment (assuming that the functionality of the system is not adversely affected).

As used herein, the term "access point" means any component, device, feature, element, or function that is configured to receive/transmit wireless traffic from a wireless client device in a WLAN environment. Traditionally, an access point or an access point device refers to a hardware component that includes a radio module, memory, processing logic, and a network communication module that enables it to communicate with other network architecture components. For convenience, the term "access point" as used herein contemplates an access point device in the traditional sense, in addition to a subsystem that includes an access port device and a wireless switch. Moreover, the term "access point" contemplates any individual component, device, hardware, or system, and any combination thereof, that is configured to function in the manner described herein. For example, the channel management features described herein may be implemented in an untraditional architecture that combines the necessary radio module, processing power, memory, and the like with additional features not typically found in conventional stand-alone access point devices.

The WMM/WME specification, from Wi-Fi Alliance, is a subset of the IEEE 802.11e specification. WMM/WME relates to the handling of multimedia over a WLAN. WMM/WME generally specifies a technique for prioritizing data depending upon the type of data being transmitted. For example, voice data and video data, which is typically sensitive to transmission delay, may be prioritized higher than other data, such as web browser traffic, that is not as time sensitive. Thus, a transmitter (for either a mobile client device or infrastructure devices) will use different parameters depending upon the type of data. In the example embodiment, there are four WMM/WME priority levels, and four WMM/WME access categories for each priority level. The WMM/WME priority levels for each WMM/WME access category (in increasing order) are: background; best effort; video; and voice. The priority levels are mapped to the eight priority levels set forth in IEEE Standard 802.11d; the content of which is incorporated by reference herein. For example, more aggressive parameters can be used for voice and video, thus increasing the likelihood that such data will be transmitted quickly. Under the 802.11 and 802.11d specification, the infrastructure device delivers the channel information to the mobile client device when the mobile client device attaches to the network. The channel information includes, without limitation, the current channel being used by the infrastructure device in a particular country and according to the 802.11d specification; name of the particular country, starting channel number, and total number of channels available for data transmission in a the particular country. The mobile client device then communicates with the infrastructure device on a current channel being used by the infrastructure device. The 802.11e WMM/WME specification assumes that channel information applies to all WMM/WME access categories.

In accordance with 802.11, wireless access points are typically associated with a basic service set ("BSS") and an extended service set ("ESS"). A Basic Service Set (BSS) is the basic building block of an IEEE 802.11 wireless LAN. The mobile clients covered by one access point is called a BSS. An access point acts as a master to control the mobile clients within that BSS. A basic BSS consists of at least one mobile client and one access point. In infrastructure mode, groups of BSSs can be connected together with the use of a backbone network and form a network called an extended service set (ESS). An ESS is a set of one or more interconnected BSSs and integrated local area networks (LANs) that appear as a single BSS to any mobile client associated with one of those BSSs. The set of interconnected BSSs in an ESS must have a common ESS identifier ("ESSID") and work on different channels.

In Wi-Fi Wireless LAN computer networking, a basic service set identifier (BSSID) is a code attached to all packets on a wireless network to identify each packet as part of that network. The code includes a 6 byte medium access control (MAC) address. Apart from identifying each packet, a BSSID also serves to uniquely identify a group of wireless network devices used in a given BSS. Each BSS is identified by a BSSID, and all wireless devices attempting to communicate with each other must share the same BSSID. WLANs are assigned a BSSID for the given infrastructure device.

The 802.11 and 802.11d channel information are delivered using 802.11 beacons, probe responses, and association responses. A beacon is broadcast from an access point on a periodic basis. The access point periodically sends a beacon to announce its presence and relay information, such as ESSID, channel information, and other parameters regarding the access point to mobile clients that are within range. Mobile clients continually scan all 802.11 radio channels and listen to beacons as the basis for choosing which access point is best to associate with. When a mobile client device is searching for a network, it transmits a probe. An access point within range of the mobile client device will respond with a probe response. A mobile client sends a probe request when it needs to obtain information from an access point. For example, a mobile client would send a probe request to determine which access points are within range. After access point receives a probe request, it will respond with a probe response, containing capability information, supported data rates, etc.

If the mobile client device is seeking a network connection, it sends an association request to the access point. An association response, which is sent by the access point in response to an association request, is utilized to establish the communication channel between the mobile client device and the access point. An 802.11 association enables the access point to allocate resources for and synchronize with a mobile client device. A mobile client device begins the association process by sending an association request to an access point. This carries information about the mobile client device (e.g., supported data rates) and the ESSID of the network it wishes to associate with. After receiving the association request, the access point considers associating with the mobile client device, and (if accepted) reserves memory space and establishes an association ID for the mobile client device. An access point sends an association response frame containing an acceptance or rejection notice to the mobile client device requesting association. If the access point accepts the mobile client device, the response includes information regarding the association, such as association ID and supported data rates. If the outcome of the association is positive, the mobile client device can utilize the access point to communicate with other mobile client devices on the network and systems on the distribution side of the access point (e.g., Ethernet).

A WLAN relies on infrastructure components that establish data communication links with mobile client devices. A mobile client device communicates, via a wireless data communication channel, with an access point, which in turn communicates with other network components via traditional wired interfaces. A WLAN may also include wireless switches as needed. A WLAN infrastructure may be configured to support a plurality of mobile clients using a single access point device. In other words, one access point device can support a plurality of different groups or categories of mobile clients each with a wide range of possible data rate or bandwidth requirements.

FIG. 1 is a simplified schematic representation of a typical WLAN infrastructure 100, including mobile client devices 102/104, an infrastructure device 106 such as an access point, and a network architecture 108. As explained above, infrastructure device 106 may be realized as a subsystem that includes an access port device and one or more components of network architecture 108, e.g., a wireless switch. A practical WLAN infrastructure 100 may include any number of mobile client devices and any number of access points dispersed throughout the area of coverage. A mobile client device can be any computing device having the wireless transceiver and interface capabilities necessary to communicate with access point 106 via wireless links 110/112. Although not shown in FIG. 1 for clarity, WLAN infrastructure 100 may include one or more wireless switches coupled between access points and network architecture 108. Infrastructure device 106 can communicate with the remaining network architecture 108 via any suitable data communication link 114, such as an Ethernet data cable. Network architecture 108 may include any number of traditional computer network components, including, but not limited to: switches, routers, servers, interfaces, data storage devices, or the like.

Figure 2:
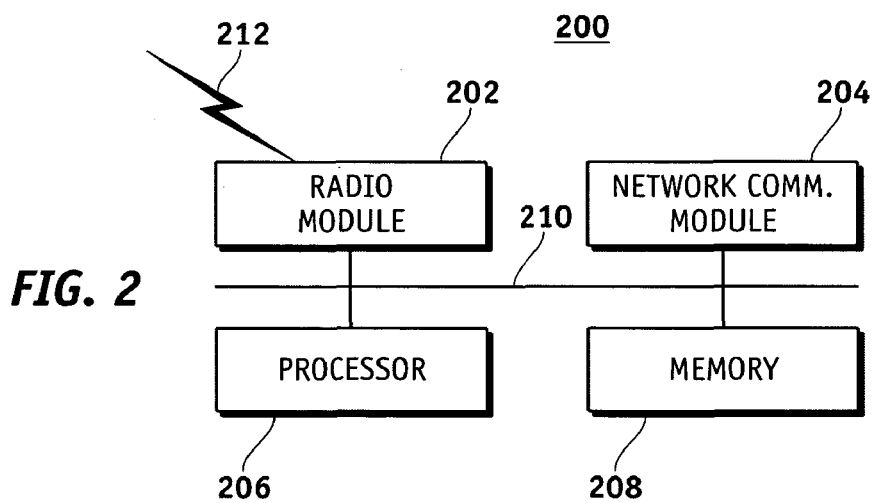
FIG. 2 is a schematic representation of an infrastructure device configured in accordance with an example embodiment of the invention.

FIG. 2 is a schematic representation of an infrastructure device 200 configured in accordance with an example embodiment of the invention. A practical embodiment of infrastructure device 200 will include additional components and elements configured to support known or conventional operating features that need not be described in detail herein. In the example embodiment, infrastructure device 200 is a wireless access point that transmits and receives data. An access point connects users to other users within the network and can also serve as the point of interconnection between a WLAN and a fixed wire network. Each access point can serve multiple users within a defined network area and each access point can communicate with any number of other access points and/or other network components. As a wireless client moves beyond the range of one access point, the mobile client device can decided to associate with another access device, e.g., a different access point. In practice, the number of infrastructure devices in a given network generally increases with the number of network users and the physical size of the network.

Infrastructure device 200 generally includes a physical housing (not shown), a radio module 202, a network communication module 204, a processor architecture 206 or any suitably configured processing logic element, and an appropriate amount of memory 208. A practical infrastructure device 200 may include any number of radio modules, any number of network communication modules, any number of processor devices, and any number of memory elements; the illustrated device depicts a simple embodiment for ease of description. These and other elements of infrastructure device 200 may be interconnected together using a bus 210 or any suitable interconnection arrangement. Such interconnection facilitates communication between the various elements of wireless access device 200. Those of skill in the art will understand that the various illustrative blocks, modules, circuits, and processing logic described in connection with the embodiments disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software depends upon the particular application and design constraints imposed on the overall system. Those familiar with the concepts described herein may implement such functionality in a suitable manner for each particular application, but such implementation decisions should not be interpreted as causing a departure from the scope of the present invention.

Radio module 202, which includes a receiver and a transmitter (or a transceiver), is configured to communicate with mobile client devices via one or more wireless data communication links 212. Radio module 202 may cooperate with a suitably configured RF antenna arrangement (not shown) that supports the particular wireless communication protocol. In the example embodiment, radio module 202 is configured to support WLAN connectivity in compliance with established IEEE Standards, such as 802.11, 802.11a, 802.11b, 802.11d. 802.11e and 802.11g. Radio module 202 may be configured to support alternate or additional wireless data communication protocols, including future variations of 802.11 such as 802.11n. As described in more detail below, radio module 202 is configured to receive wireless signals that convey channel information corresponding to media type access categories in the wireless network.

Network communication module 204 generally represents the hardware, software, firmware, processing logic, and/or other components of wireless access device 200 that enable bi-directional communication between infrastructure device 200 and network components to which wireless access device 200 is connected. For example, network communication module 204 may be configured to support 10/100 Mbps Ethernet LAN traffic. Referring to FIG. 1 as an example, network communication module 204 is suitably configured to transmit data to components in network architecture 108, and to receive data from components in network architecture 108. In a typical deployment, network communication module 204 provides an Ethernet interface such that wireless access device 200 can communicate with a conventional Ethernet-based computer network. In this regard, network communication module 204 may include a physical interface, such as 10/100/1000 Mbps, for connection to the computer network, and network communication module 204 (and/or processor 206) may handle Ethernet addressing for data packets sent from wireless access device 200.

Processor architecture 206 may be implemented or realized with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this regard, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration. In practice, processor architecture 206 includes processing logic that is configured to carry out the functions, techniques, and processing tasks associated with the operation of wireless access device 200. In particular, the processing logic is configured to support the channel management techniques described herein. As mentioned above, in practical embodiments the processing logic may be resident in an access point device that includes radio module 202, or in a wireless switch, which may be considered to be part of network architecture 108 that communicates with an access port device that includes radio module 202.

Furthermore, the steps of a method or algorithm described in connection with the embodiments disclosed herein may be embodied directly in hardware, in firmware, in a software module executed by processor architecture 206, or in any practical combination thereof. A software module may reside in memory 208, which may be realized as RAM memory, flash memory, ROM memory, EPROM memory, EEPROM memory, registers, a hard disk, a removable disk, a CD-ROM, or any other form of storage medium known in the art. In this regard, memory 208 can be coupled to processor architecture 206 such that processor architecture 206 can read information from, and write information to, memory 208. In the alternative, memory 208 may be integral to processor architecture 206. As an example, processor architecture 206 and memory 208 may reside in an ASIC.

Figure 3:
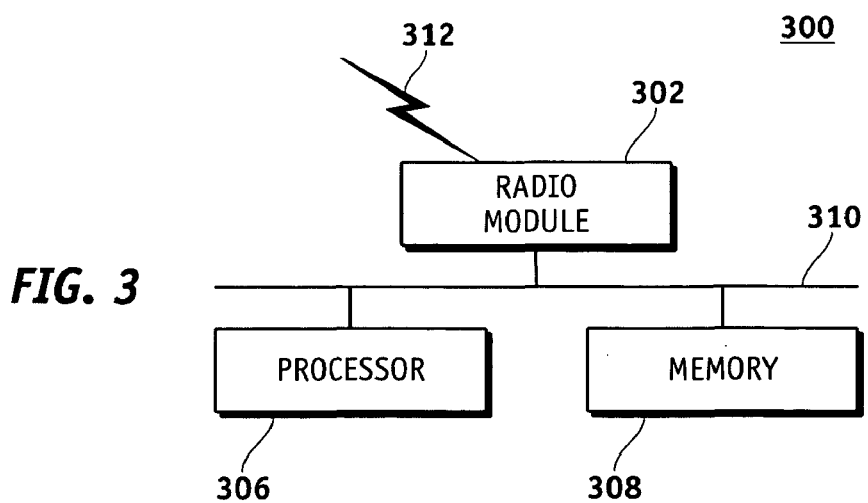
FIG. 3 is a schematic representation of a mobile client device configured in accordance with an example embodiment of the invention.

FIG. 3 is a schematic representation of a mobile client device 300 configured in accordance with an example embodiment of the invention. A practical embodiment of mobile client device 300 will include additional components and elements configured to support known or conventional operating features that need not be described in detail herein. In the example embodiment, the mobile client device 300 transmits and receives data wirelessly to and from access points or infrastructure devices, such as the infrastructure device 106. An infrastructure device connects mobile client devices to other users within the network and can also serve as the point of interconnection between a WLAN and a fixed wire network. Each infrastructure device can serve multiple mobile client devices within a defined network area. As a mobile client device moves beyond the range of one infrastructure device, the mobile client device can decide to associate to another infrastructure device, e.g., a candidate infrastructure device. A mobile client device may be, for example, without a limitation, a wireless laptop computer or a mobile phone.

Mobile client device 300 generally includes a physical housing (not shown), a radio module 302, a processor architecture 306 or any suitably configured processing logic element, and an appropriate amount of memory 308. A practical mobile client device 300 may include any number of radio modules, any number of processor devices, and any number of memory elements; the illustrated device depicts a simple embodiment for ease of description. These and other elements of mobile client device 300 may be interconnected together using a bus 310 or any suitable interconnection arrangement. Such interconnection facilitates communication between the various elements of mobile client device 300.

Radio module 302, which includes a receiver and a transmitter (or a transceiver), is configured to communicate with infrastructure devices via a wireless data communication link 312. Radio module 302 may cooperate with a suitably configured RF antenna arrangement (not shown) that supports the particular wireless communication protocol. In the example embodiment, radio module 302 is configured to support WLAN connectivity in compliance with established IEEE Standards, such as 802.11, 802.11a, 802.11b, 802.11d, 802.11e and 802.11g. Radio module 302 may be configured to support alternate or additional wireless data communication protocols, including future variations of 802.11 such as 802.11n. As described in more detail below, radio module 302 is configured to wirelessly receive signals that convey active channel information corresponding to media type access categories from access points.

Processor architecture 306 may be implemented or realized in the manner described above for processor architecture 206 (see FIG. 2). In practice, processor architecture 306 includes processing logic that is configured to carry out the functions, techniques, and processing tasks associated with the operation of mobile client device 300. In particular, the processing logic is configured to support the channel management techniques described herein.

Furthermore, the steps of a method or algorithm described in connection with the embodiments disclosed herein may be embodied directly in hardware, in firmware, in a software module executed by processor architecture 306, or in any practical combination thereof. A software module may reside in memory 308, which may be realized as RAM memory, flash memory, ROM memory, EPROM memory, EEPROM memory, registers, a hard disk, a removable disk, a CD-ROM, or any other form of storage medium known in the art. In this regard, memory 308 can be coupled to processor architecture 306 such that processor architecture 306 can read information from, and write information to, memory 308. In the alternative, memory 308 may be integral to processor architecture 306. As an example, processor architecture 306 and memory 308 may reside in an ASIC.

Figure 4:
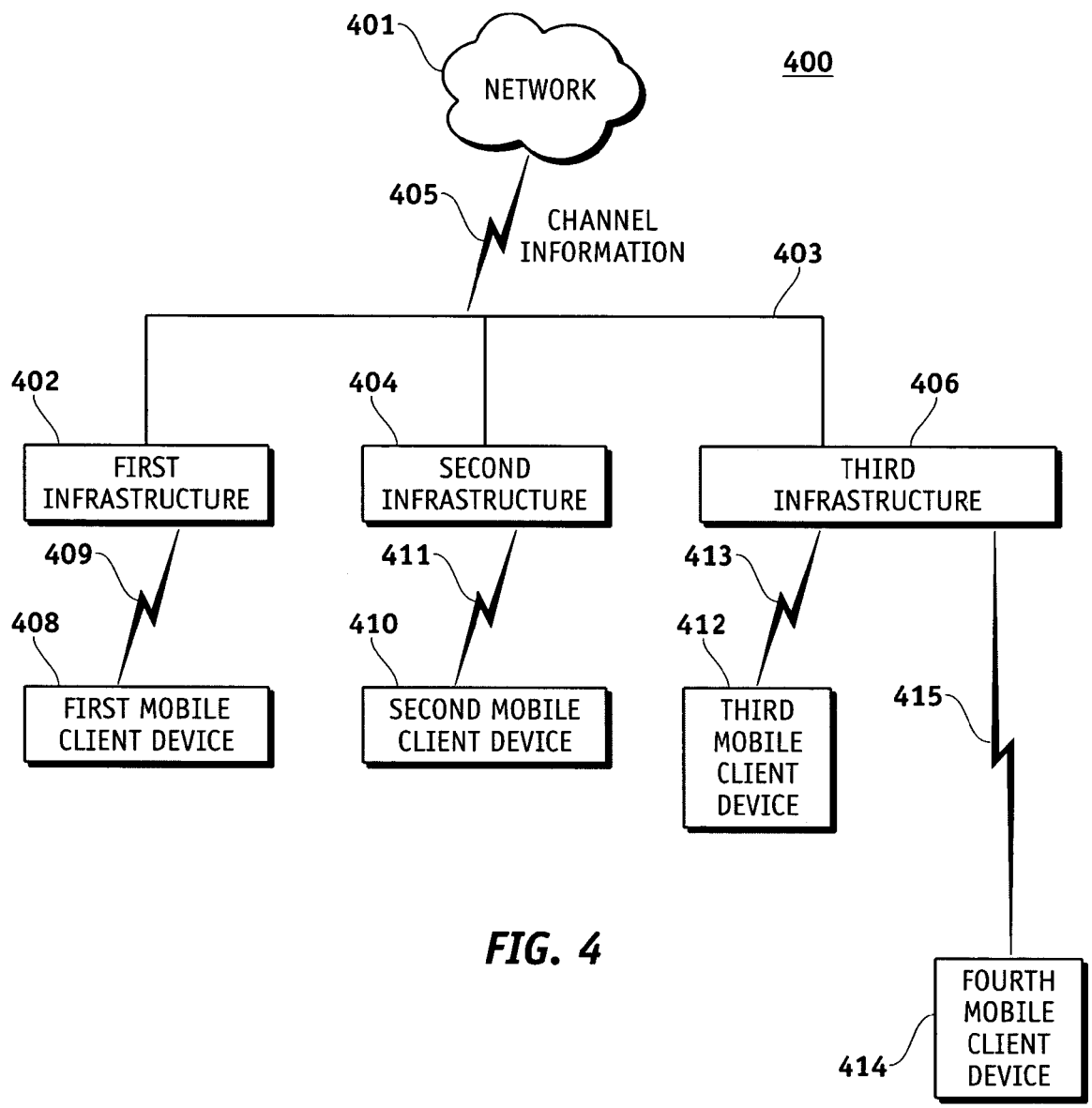
FIG. 4 is a schematic representation of a WLAN environment.

FIG. 4 is a schematic representation of a WLAN environment 400 having three infrastructure devices connected in a common WLAN infrastructure and communicating with a wireless network 401. WLAN environment 400 is depicted with four mobile client devices in association with the common WLAN infrastructure. WLAN environment 400 depicts an example communication session that may be carried out by components in the network shown in FIG. 1. In this simplified example, three infrastructure devices 402/404/406 are depicted, along with four mobile client devices 408/410/412/414. This simplified arrangement facilitates the following description of the example communication session, and is not intended to limit the scope or application of the invention in any way.

Each infrastructure device shown in FIG. 4 may represent a different logical WLAN having different bandwidth and data rate capabilities for each WMM/WME access category, with each infrastructure device having different active channels to be utilized for communicating data using at least one of the WMM/WME access categories. Each infrastructure device is configured with channel information. Infrastructure devices can be configured from a central point in the infrastructure network 401 using a communication link 405 and/or from other infrastructure devices in the network using communication link 403. This channel information is utilized by the receiving infrastructure device to determine the active channels. According to one example embodiment of this invention, a first mobile client device 408 communicates with the first infrastructure device 402, and the first infrastructure device sends information indicative of the active channels to support WMM/WME voice data for use by the first mobile client device 408 using the communication link 409. A second mobile client device 410 communicates with the second infrastructure device 404, and the second infrastructure device 404 sends information indicative of the active channels to support WMM/WME video data for use by the second mobile client 410 using the communication link 411. A third mobile client device 412 communicates with the third infrastructure device 406, and the third infrastructure device 404 sends information indicative of the active channels to support the WMM/WME background data type for use by the third mobile client device 412 using the communication link 413. Moreover, the fourth mobile client device 414 also communicates with the third infrastructure device 406, and the third infrastructure device 406 sends information indicative of the active channels to support a WMM/WME best effort type data type for use by the fourth mobile client device 414 using communication link 415. In practice, any given infrastructure device can send active channel information corresponding to any of the WMM/WME access categories. FIG. 4 depicts a simple example of four mobile devices for convenience in describing the four WMM/WME access categories.

As the mobile client devices 408/410/412/414 move around the environment 400, a different infrastructure device may support communication using the same or different active channels. In this regard, each mobile client device selects an infrastructure device having an active channel to support at least one of the WMM/WME access categories for use by the mobile client device as explained in detail below.

Figure 5:
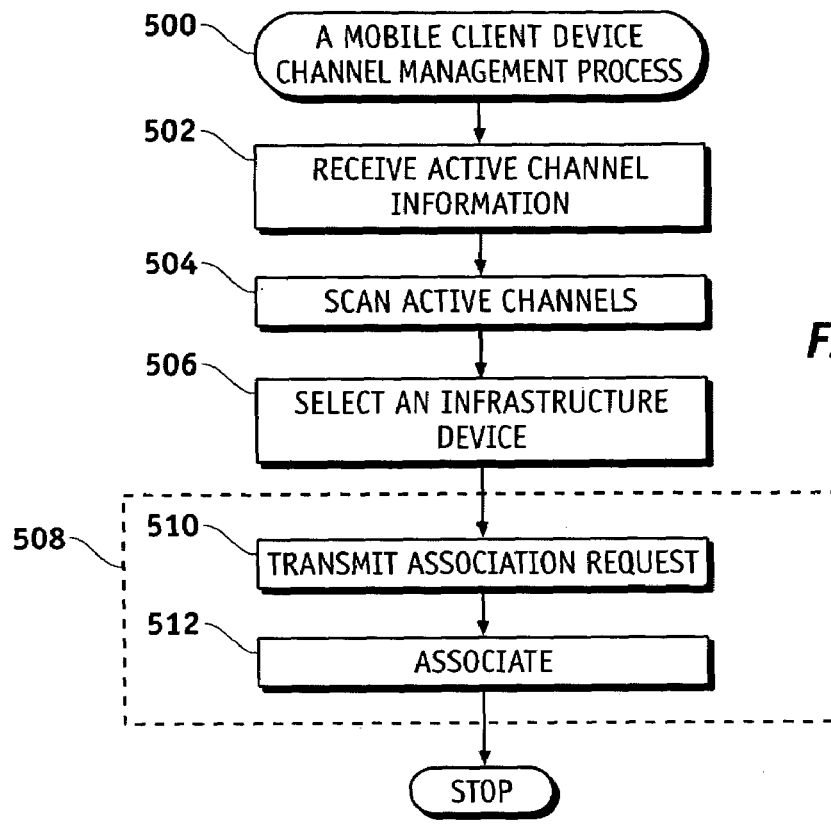
FIG. 5 is a flow chart of a channel management process that may be performed by a mobile client device configured in accordance with an example embodiment of the invention.

FIG. 5 is a flow chart of a channel management process in accordance with an example embodiment of the invention, which may be suitable for 802.11, 802.11d and 802.11e direct sequence and OFDM WLAN radios. Process 500 may be performed by a mobile client device configured in accordance with an example embodiment of the invention, and process 500 may be carried out in conjunction with the communication session depicted in FIG. 4. The various tasks performed in connection with process 500 may be performed by software, hardware, firmware, or any combination thereof. For illustrative purposes, the following description of process 500 may refer to elements mentioned above in connection with FIGS. 1-4. In practical embodiments, portions of process 500 may be performed by different elements of the described systems. It should be appreciated that process 500 may include any number of additional or alternative tasks, the tasks shown in FIG. 5 need not be performed in the illustrated order, and process 500 may be incorporated into a more comprehensive procedure or process having additional functionality not described in detail herein.

Process 500 may begin by receiving active channel information corresponding to media type access categories from infrastructure devices (task 502). For each of the infrastructure devices, the active channel information may include, without limitation, a total number of active channels associated with the infrastructure devices in the wireless network, a channel identification number assigned to each of the active channels, a BSSID of each of the infrastructure devices associated with each of the active channels, and/or a percent bandwidth allocated for each of the active channels for communicating data for at least one of the media type access categories. The active channel information may be provided by, without limitation, the mobile client devices in the wireless network. 802.11 devices, as explained above, may use all available channels, but in practice, two or three active channels are actually used by access points or ad hoc stations and networks. In this regard, the total number of active channels represents the total number of channels used by all the infrastructure devices in the wireless network. In this regard, the total number of active channels may be relatively small (for example, two or three) compared to the total number of available channels. The channel identification number may be, without limitation, any number from one to the total number of the available channels defined by 802.11d international roaming information element. For example, the total number of all available channels may be, without limitation, 11 or 13 as explained above and the channel identification number may be any number from 1 to 11/13. In this regard, the channel identification numbers may be 2, 4 or 11 corresponding to a total of 3 active channels. The BSSID, as explained above, is the MAC address of the infrastructure device. The percent bandwidth measure represents the bandwidth available per each ESSID on a channel for the case when multiple ESSIDs are supported per each BSSID on an infrastructure device.

Additionally, the active channel information may include a total number of the active channels corresponding to collocated radios associated with infrastructure devices in the network, a channel identification number assigned to each of the active channels corresponding to each of the collocated radios, a BSSID of each of the infrastructure devices associated with each of the active channels corresponding to each of the collocated radios, and a percent bandwidth allocated for each of the active channels corresponding to the collocated radios for communicating data for at least one of the media type access categories. Radios may be collocated in the same infrastructure device and may be transmitted on different channels. For example, an 802.11g radio may be collocated in the same infrastructure device with an 802.11a radio with each transmitted on a different channel.

In this example, each media type access category corresponds to a WMM/WME access category. As mentioned above, the WMM/WME access categories include a voice data type category, a video data type category, a best effort data type category and a background data type category.

For a given connection, the mobile client device will select an active channel with sufficient bandwidth for transmitting each media type access category. The mobile client device uses the active channel information sent by the infrastructure devices in the wireless network to scan for other infrastructure devices in the wireless network. In this regard, the mobile client device scans the active channels (task 504) based upon the active channel information. The mobile client device can use the active channel information to precisely determine which active channels are to be utilized when scanning and pre-emptively roaming between access points. Active channel information is provided to the mobile client through 1) passive reception of beacons (passive scan) prior to transmitting on any active channel, 2) during transmitting of probes (partial scan) for pre-emptive roaming between infrastructure devices and 3) receiving channel information from the infrastructure device after connecting to the infrastructure device. Based upon the active channel information corresponding to all the infrastructure devices in the network, the mobile client device may then select an infrastructure device to roam to that provides the best performance for communicating data using at least one of the media type access categories (task 506). Once the mobile client device has determined which infrastructure device to roam to, the mobile client device pre-emptively roams 508 to the selected infrastructure device. In this regard, the mobile client device uses the active channel information to transmit an association request (task 510) in an attempt to associate with the selected infrastructure device (task 512), and process 500 ends.

Figure 6:
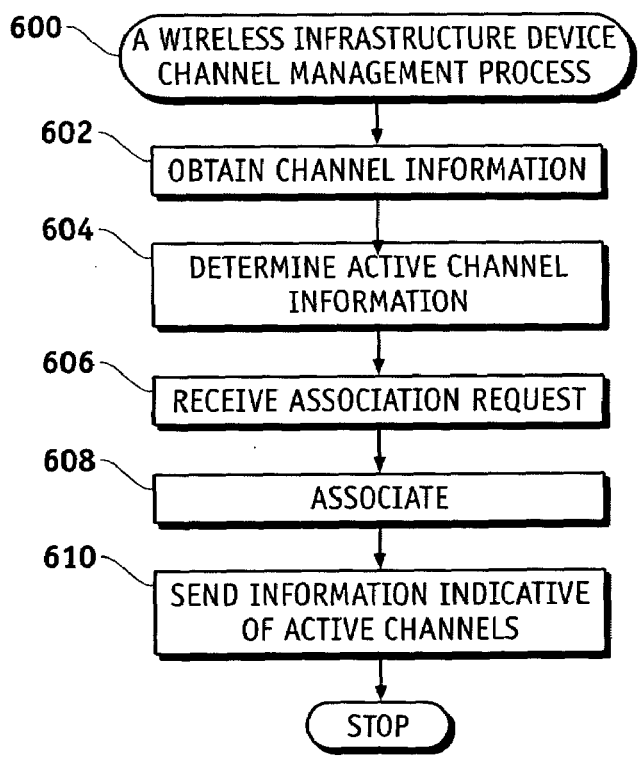
FIG. 6 is a flow chart of a channel management process that may be performed by an infrastructure device configured in accordance with an example embodiment of the invention.

Each infrastructure device determines and sends its respective active channel information for each WMM/WME access category to the mobile client devices as explained below. FIG. 6 is a flow chart of a channel management process that may be performed by an infrastructure device configured in accordance with an example embodiment of the invention which may be suitable for 802.11e/802.11d direct sequence and OFDM WLAN radios. Process 600 may be carried out in conjunction with the communication session depicted in FIG. 4.

Process 600 may begin by obtaining channel information (task 602) at a first infrastructure device for the wireless network, the channel information corresponding to media type access categories for one or more mobile client devices supported by a second infrastructure device for the wireless network. In this example, the first infrastructure device may be any of the infrastructure devices 402/404/406 and the second infrastructure device may also be any of the infrastructure devices 402/404/406. Infrastructure devices in the network such as access points and wireless switches may obtain the channel information in the following ways: 1) being pre-configured with active channel information, 2) receiving channel information corresponding to all the active channels in the wireless network through a central point on the communication link 403, or 3) share their current active channels by sending messages containing channel information to other access points through link 403. In the case of a wireless switch which controls multiple access ports, the wireless switch determines the active channel information supported by all its access ports. Access ports then receive active channel information from the wireless switch.

The channel information, without limitation, may include: a total number of channels associated with infrastructure devices in the wireless network, a channel identification number assigned to each of the channels, a BSSID of each of the infrastructure devices associated with each of the channels, and a percent bandwidth allocated for each of the channels for communicating data for at least one of the media type access categories. These items were described above in connection with FIG. 5. The total number of channels differs according to the regulations of each country as explained above. For example, in the United States, FCC regulations only allow channels 1-11 to be used. For the U.S. case, the total number of channels is 11 and the channel identification number is any number from 1 to 11. In Europe, for example, channels 1-13 are licensed for 802.11b operation. For the European case, the total number of channels is 13 and the channel identification number is any number from 1 to 13. As mentioned above, the default channel assignment may be communicated by an 802.11d international roaming information element. Additionally, channel information, without limitation, includes: a channel identification number assigned to each of the channels corresponding to each of the collocated radios, a BSSID of each of the infrastructure devices associated with each of the channels corresponding to each of the collocated radios, and a percent bandwidth allocated for each of the channels corresponding to each of the collocated radios for communicating data for at least one of the media type access categories. Collocated radios may be, without limitation, radios such as 802.11g and 802.11b as explained in the context of FIG. 5 above.

Process 600 then, based upon the channel information obtained in task (602), determines active channel information corresponding to active channels to be utilized for communicating data for at least one of the media type access categories (task 604) to at least one of the mobile client devices. As mentioned above, the WMM/WME access categories correspond to a set of priority levels based upon data type such as a voice priority level, a video priority level, a best effort priority level, and a background priority level. In this regard, by determining the active channel for each access categories a mobile client device may not spend excessive time and power searching for active channels for transmitting high priority data such as voice data type and video data type and can send an association request with no or insignificant delay to the infrastructure device to utilize one of the active channels, determined by the infrastructure device, for communicating data for at least one of the media type access categories based on the priority levels. The infrastructure device may then receive an association request (task 606) and may associate (task 608) (by sending an association response), utilizing one of the active channels, with the mobile client device. After associating with the mobile client device, the infrastructure device may then send information indicative of the active channels to at least one mobile client device in the wireless network (610) as explained above in the context of FIG. 5.

In this regard, to maximize performance and expedite data transmission, specifically for non-delay-tolerant data types such as WMM/WME video and voice data types, of the WLAN network, a mobile client device can connect to the infrastructure device utilizing one of the active channels pre-determined by the infrastructure device without a need to search through all the channels available in the network.

While at least one example embodiment has been presented in the foregoing detailed description, it should be appreciated that a vast number of variations exist. It should also be appreciated that the example embodiment or embodiments described herein are not intended to limit the scope, applicability, or configuration of the invention in any way. Rather, the foregoing detailed description will provide those skilled in the art with a convenient road map for implementing the described embodiment or embodiments. It should be understood that various changes can be made in the function and arrangement of elements without departing from the scope of the invention as set forth in the appended claims and the legal equivalents thereof.

What is claimed is:

1. A mobile client device configured for operation in a wireless network having wireless infrastructure devices that are capable of supporting a plurality of different available wireless channels, the mobile client device comprising:
   a radio module configured to wirelessly receive signals prior to the mobile client device associating with an infrastructure device in the wireless network, the signals conveying active channel information that indicates active channels that are actually being used by the wireless infrastructure devices without indicating any of the plurality of different available wireless channels that are not being used by the wireless infrastructure devices, wherein for each active channel the active channel information also indicates at least one media type access category supported by that active channel, and wherein for each of the wireless infrastructure devices the active channel information indicates a percentage of bandwidth allocated for each media type access category; and
   a processing logic element coupled to the radio module and configured to select, based upon the active channel information, based upon the percentages of bandwidth, and based upon a desired media type access category of data to be transmitted, at least one active channel to be utilized for communicating data with a desired infrastructure device, the at least one active channel having sufficient bandwidth to support transmitting for the desired media type access category, and further configured to control scanning of only the selected at least one active channel to identify a desired one of the wireless infrastructure devices, wherein the radio module transmits an association request to the desired one of the wireless infrastructure devices.

2. A mobile client device according to claim 1, wherein the at least one media type access category and the desired media type access category correspond to a plurality of WMM/WME access categories.

3. A mobile client device according to claim 2, wherein the WMM/WME access categories comprise a voice data type category, a video data type category, a best effort data type category, and a background data type category.

4. A mobile client device according to claim 1, wherein the active channel information comprises:
   a total number of active channels being used by the wireless infrastructure devices in the wireless network;
   a channel identification number assigned to each of the active channels; and
   a BSSID of each of the infrastructure devices associated with each of the active channels.

5. A mobile client device according to claim 1, wherein the active channel information comprises:
   a total number of the active channels corresponding to collocated radios associated with infrastructure devices in the network;
   a channel identification number assigned to each of the active channels corresponding to each of the collocated radios; and
   a BSSID of each of the infrastructure devices associated with each of the active channels corresponding to each of the collocated radios.

6. A method for channel management in a wireless network having a mobile client device and a plurality of wireless access points, the method comprising:
   the mobile client device receiving active channel information from a first wireless access point of the plurality of wireless access points, prior to the mobile client device associating with one of the plurality of wireless access points, wherein the active channel information indicates: (a) for each of the plurality of wireless access points, respective bandwidth and data rate capabilities for each of a plurality of different media type access categories, (b) a total number of active channels actually being used by the plurality of wireless access points, and (c) channel identification numbers assigned to each of the active channels;
   the mobile client device determining which of the total number of active channels are to be scanned, based upon the active channel information and based upon the bandwidth and data rate capabilities, by selecting active channels having sufficient bandwidth for transmitting for each of the plurality of different media type access categories, resulting in selected active channels;
   thereafter, the mobile client device scanning only the selected active channels to identify a desired one of the plurality of wireless access points; and
   the mobile client device transmitting an association request to the desired one of the plurality of wireless access points;
   wherein the plurality of different media type access categories comprise a voice data type category, a video data type category, a best effort data type category, and a background data type category.

7. The method of claim 6, wherein for each of the plurality of wireless access points the active channel information indicates a percentage of bandwidth allocated for each of the plurality of different media type access categories.

* * * * *

UNITED STATES PATENT AND TRADEMARK OFFICE
CERTIFICATE OF CORRECTION

| | | |
|---|---|---|
| PATENT NO. | : 7,881,269 B2 | Page 1 of 1 |
| APPLICATION NO. | : 11/494650 | |
| DATED | : February 1, 2011 | |
| INVENTOR(S) | : Hong | |

It is certified that error appears in the above-identified patent and that said Letters Patent is hereby corrected as shown below:

On the title page, item (56), under "OTHER PUBLICATIONS", in Column 2, Line 3, delete "allience.*" and insert -- alliance.* --, therefor.

In Column 1, Line 54, delete "802.1 μg" and insert -- 802.11g --, therefor.

Signed and Sealed this
First Day of January, 2013

David J. Kappos
*Director of the United States Patent and Trademark Office*